Aug. 10, 1926.

U. S. HARKSON 1,595,778

APPARATUS FOR DRYING EGGS

Filed Sept. 17, 1925  2 Sheets-Sheet 1

WITNESSES
Edw. Thorpe.
Robert S. Hulsizer.

INVENTOR
U. S. Harkson
BY
ATTORNEYS

Aug. 10, 1926.
U. S. HARKSON
1,595,778
APPARATUS FOR DRYING EGGS
Filed Sept. 17, 1925     2 Sheets-Sheet 2
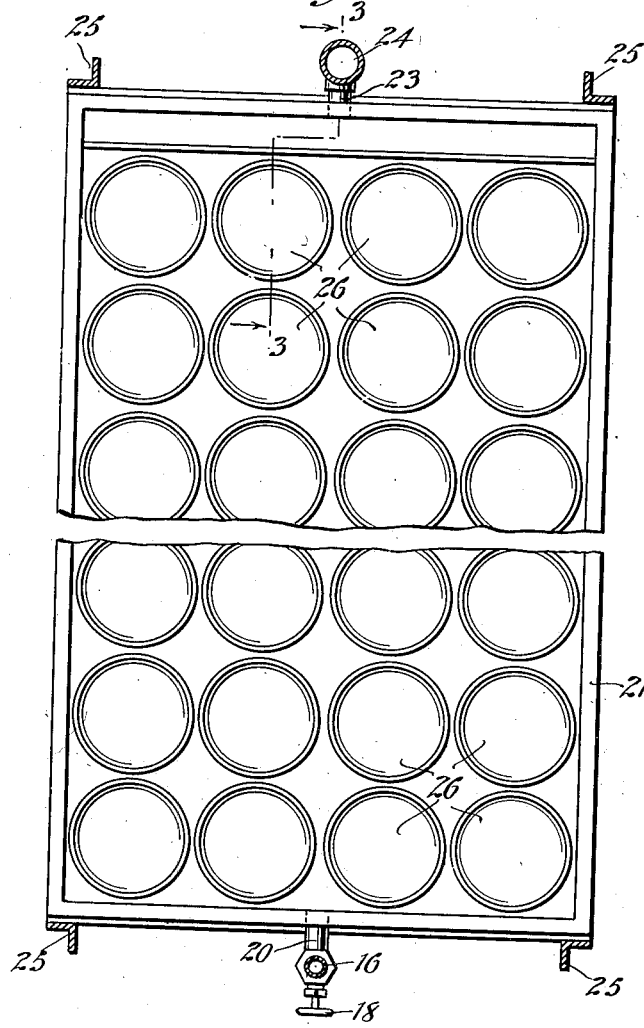
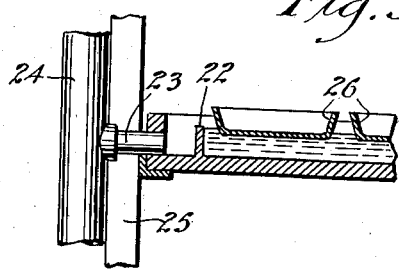
WITNESSES
INVENTOR
U. S. Harkson
BY
ATTORNEYS Patented Aug. 10, 1926.

1,595,778

UNITED STATES PATENT OFFICE.

ULYSSES SEVERIN HARKSON, OF PORTLAND, OREGON.

APPARATUS FOR DRYING EGGS.

Application filed September 17, 1925. Serial No. 57,043.

This invention relates to a method and apparatus for drying material, particularly egg products.

An object of the invention is to shorten the time required to dry such products, thus lessening the cost of manufacture.

Another object concerns the provision of means and a method whereby the resultant product will be more soluble than those produced by other methods, particularly such products as albumen and whole egg.

A further object concerns the provision of means and a method whereby the resultant product does not lose its whipping-up power.

The invention is illustrated in the drawings, of which—

Fig. 2 is a horizontal section on the line 2—2 of Fig. 1; and

Fig. 3 is a cross section taken on the line 3—3 of Fig. 2.

Figure 1:
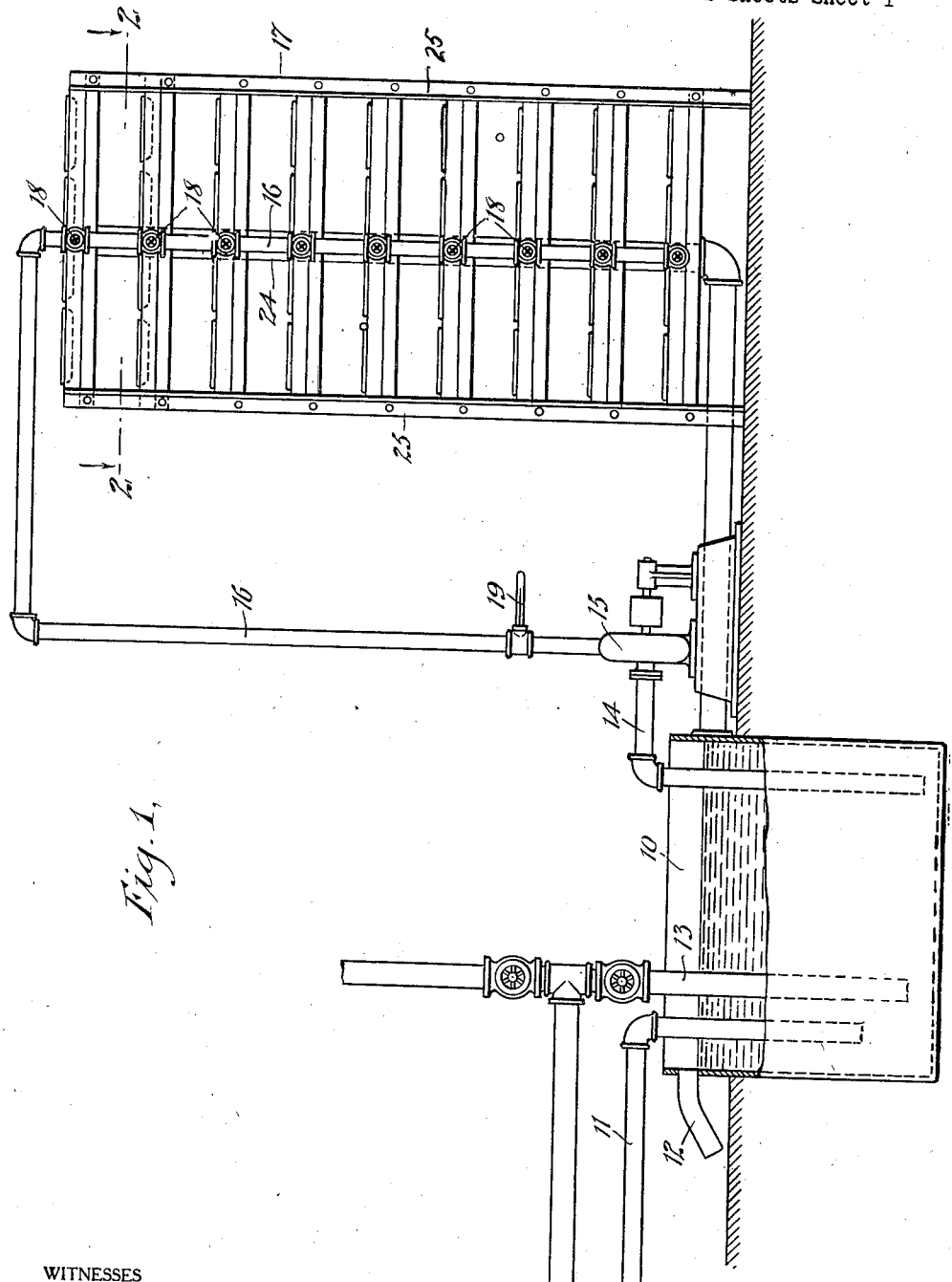
Figure 1 is a side elevation of the apparatus.

The form of the invention shown in the drawings is a preferred form, although it is understood that modifications in the construction and arrangement of the parts and in the character of the materials used may be adopted without departing from the spirit of the invention as set forth in the appended claim.

In its general aspect the invention comprises disposing a plurality of trays containing the egg product, preferably in liquid form, in a trough filled with circulating water of a predetermined temperature so that the trays will be placed in water so that the water will come directly in contact with the bottom of the tray. A plurality of these troughs are arranged in a vertical series to form a cell, and any number of cells can be connected up with the circulating system. By maintaining the water at the desired temperature with respect to the coagulation point of the egg liquid the heat transfer will take place from liquid to liquid and will be effected in about one-third the time which would be required if the heat transfer were from gas to liquid, as in the case of drying or desiccating by means of hot air. Preferably the water is introduced into one end of each trough simultaneously with its introduction into the corresponding ends of the other troughs. The water then fills each trough until the desired level is reached, whereupon it spills over the end of the trough and passes out into a common discharge pipe, flowing back into the tank, where the water is maintained at any desired temperature by any suitable means.

The apparatus employed is as follows: The tank 10 is filled with water by means of a pipe 11. The water overflows through the pipe 12. The water is heated preferably by means of steam jets through the pipe 13. The water is passed from the tank 10 through pipe 14 by means of a pump 15 feeding it into a pipe 16. This pipe 16 extends downward along the side of a cell or metal frame 17 and at different levels therein is provided with valves such as 18 so that the water passing from the pipe 16 at different levels can be regulated as to the quantity of its flow.

Preferably a thermometer 19 is disposed in the pipe 16 near the bottom 15 so that the water can be kept at any predetermined temperature, especially at a temperature determined with reference to the coagulation temperature of the material being dried. With reference to Figs. 2 and 3, the pipe 16 is shown with one of the valves 18. A short auxiliary pipe 20 extends from the pipe 16 at each level into a trough 21. This trough is of any suitable design and has at one end a spillway or plate 22 so that as the water flows into the trough it will attain a desired level before it spills over the plate 22 into the main trough where it will pass out through an auxiliary pipe 23 into the main discharge pipe 24 which extends vertically along the opposite side of the cell.

Preferably the cell is formed of a series of angle plates such as 25 (see Fig. 2), which can be built up to any height and support any desired number of troughs.

Within each trough are disposed a plurality of trays or pans 26. These pans are adapted to contain the egg product or any other product which is to be dried. The egg products are preferably in liquid form and the pans preferably float on the hot water contained within each trough.

It will be observed that by controlling the discharge rate of the pump 15 and the degree of opening of each of the valves 18 the amount of water circulating through the various troughs can be selectively controlled, and that by observing the thermometer 19 and varying the amount of steam supplied to the tank 10 through the pipe 13, the temperature of the circulating water can be kept at a desired point.

In accordance with this method and by the use of this apparatus it is found, therefore, that the time required to dry a product such as egg liquid is reduced by substantially thirty per cent, and that the quality of the resultant product is much superior, especially with regard to its capacity to whip up. Furthermore, the conditions under which the workmen can operate the device are more sanitary and healthful because of the temperature of the room, which is not required to be maintained at the usual temperatures required in the use of an air-operating method, viz., in the neighborhood of 140° F. In this apparatus the water is maintained at the desired temperature but the room temperature need only be normal. It is found that these particular benefits are substantially entirely resultant from the method of transferring the heat from a liquid, such as hot water, to the liquid product, whereas in previous methods which do not have these advantages, the heat transfer has been effected from gas, such as hot air, to the liquid product to be dried.

What I claim is:—

Apparatus for drying liquid products such as egg liquid, which comprises a plurality of troughs disposed one above each other on a frame, means for simultaneously circulating water in said troughs, means for controlling the flow of liquid into each trough, a common discharge means for the water flowing from each trough, means for circulating the water through said supply and discharge means, means for controlling the temperature of said water, and a plurality of pans in each trough, said pans being partially immersed in the liquid, said pans adapted to contain egg liquid, whereby the transfer of heat is direct from liquid to liquid.

ULYSSES SEVERIN HARKSON.